United States Patent
Aubert et al.

(10) Patent No.: US 9,725,179 B2
(45) Date of Patent: Aug. 8, 2017

(54) ELECTRICAL GENERATOR FOR ROTATING STRUCTURE

(71) Applicants: BELL HELICOPTER TEXTRON INC., Fort Worth, TX (US); UNIVERSITE DU QUEBEC A CHICOUTIMI, Chicoutimi (CA)

(72) Inventors: Roger Aubert, Arlington, TX (US); Martin Truchon, Chicoutimi (CA); Eric Sinusas, Euless, TX (US); Mohammed Boussetoua, Chicoutimi (CA); Mohand Ouhrouche, Chicoutimi (CA); Guy Fortin, Montreal (CA); Carol Mercier, Chicoutimi (CA); Jean Perron, Chicoutimi (CA)

(73) Assignees: UNIVERSITE DU QUEBEC A CHICOUTIMI, Chicoutimi (CA); BELL HELICOPTER TEXTRON INC., Fort Worth, TX (US)

( * ) Notice: Subject to any disclaimer, the term of this patent is extended or adjusted under 35 U.S.C. 154(b) by 679 days.

(21) Appl. No.: 13/768,900

(22) Filed: Feb. 15, 2013

(65) Prior Publication Data
US 2013/0228654 A1    Sep. 5, 2013

Related U.S. Application Data

(60) Provisional application No. 61/600,328, filed on Feb. 17, 2012.

(51) Int. Cl.
*B64C 27/18* (2006.01)
*B64D 15/12* (2006.01)
(Continued)

(52) U.S. Cl.
CPC .............. *B64D 15/12* (2013.01); *B64C 27/12* (2013.01); *H02K 7/116* (2013.01); *H02K 16/005* (2013.01); *H02K 7/1004* (2013.01)

(58) Field of Classification Search
CPC ....................................... B64C 27/18
(Continued)

(56) References Cited

U.S. PATENT DOCUMENTS 5,089,734 A * 2/1992 Bickraj ................ H02K 16/005
                                                 310/115
5,260,617 A * 11/1993 Leibowitz .............. H02K 16/00
                                                 290/6
(Continued)

FOREIGN PATENT DOCUMENTS

CA    2549194 A1    11/2007
DE    4113624       10/1992
(Continued)

OTHER PUBLICATIONS

Office Action dated Jun. 20, 2014 from counterpart CA App. No. 2,806,106.
(Continued)

*Primary Examiner* — Brian M O'Hara
*Assistant Examiner* — Keith L Dixon
(74) *Attorney, Agent, or Firm* — James E. Walton

(57) ABSTRACT

An electrical generator assembly including a central rotatable shaft (12) having a winding assembly (26) mounted thereto for rotation therewith, a rotatable permanent magnet assembly (28) surrounding the winding assembly (26) adjacent thereto and in use cooperating therewith to induce a current in the winding assembly (26), and a drive system (38, 138, 238, 338, 438) drivingly interconnecting the central shaft (12) and the permanent magnet assembly (28), the drive system (38, 138, 238, 338, 438) defining a relative
(Continued)

rotational speed between the permanent magnet assembly (28) and the winding assembly (26) which is greater than an absolute rotational speed of the winding assembly (26). A method of powering an electrical system (22) on a rotating rotor blade (18) supported by a rotating mast (12) is also discussed.

23 Claims, 12 Drawing Sheets

(51) Int. Cl.
*H02K 16/00* (2006.01)
*H02K 7/116* (2006.01)
*B64C 27/12* (2006.01)
*H02K 7/10* (2006.01)

(58) Field of Classification Search
USPC ............................ 244/17.11; 310/114, 118
See application file for complete search history.

(56) References Cited

U.S. PATENT DOCUMENTS

| | | | | |
|---|---|---|---|---|
| 5,793,137 A * | 8/1998 | Smith | ............... | H02K 21/48 |
| | | | | 310/114 |
| 6,157,147 A | 12/2000 | Lin | | |
| 6,181,235 B1 | 1/2001 | Smith | | |
| 6,239,524 B1 * | 5/2001 | Leibowitz | ............ | H02K 7/1004 |
| | | | | 290/6 |
| 6,242,881 B1 * | 6/2001 | Giordano | ............... | F02N 11/04 |
| | | | | 244/17.11 |
| 6,344,700 B1 | 2/2002 | Eisenhauer et al. | | |
| 6,520,886 B2 | 2/2003 | Schwertberger | | |
| 6,707,190 B2 * | 3/2004 | Leibowitz | ............. | H02K 16/00 |
| | | | | 310/112 |
| 7,262,533 B2 * | 8/2007 | Fiset | .................. | H02K 57/00 |
| | | | | 310/113 |
| 7,728,478 B2 * | 6/2010 | Barreiro | ............. | H02K 16/005 |
| | | | | 290/1 C |
| 7,786,634 B2 * | 8/2010 | Harju | ................. | H02K 16/005 |
| | | | | 310/83 |
| 7,982,351 B2 * | 7/2011 | Atallah | ............... | H02K 11/048 |
| | | | | 310/114 |
| 8,628,042 B2 | 1/2014 | Imbert et al. | | |
| 2008/0225536 A1 | 9/2008 | Landry | | |
| 2010/0013223 A1 | 1/2010 | Certain | | |
| 2010/0043425 A1 | 2/2010 | Dragic | | |
| 2010/0327588 A1 * | 12/2010 | Macchia | ............... | F01D 15/10 |
| | | | | 290/52 |
| 2011/0036093 A1 | 2/2011 | Dooley | | |

FOREIGN PATENT DOCUMENTS

| | | |
|---|---|---|
| DE | 2008064244 A1 | 6/2010 |
| EP | 2218643 A1 | 8/2010 |
| GB | 584563 | 1/1947 |
| WO | 9611338 | 4/1996 |
| WO | 2011/119458 A1 | 9/2011 |
| WO | 2011119458 A1 | 9/2011 |

OTHER PUBLICATIONS

Extended European Search Report issued from the European Patent Office dated Jul. 2, 2013 from corresponding European Patent Application No. 13155316.6-1809.

Office Action dated Sep. 1, 2015 from counterpart CA App. No. 2,806,106.

Office Action dated Jun. 1, 2016 from counterpart CA App. No. 2,806,106.

* cited by examiner

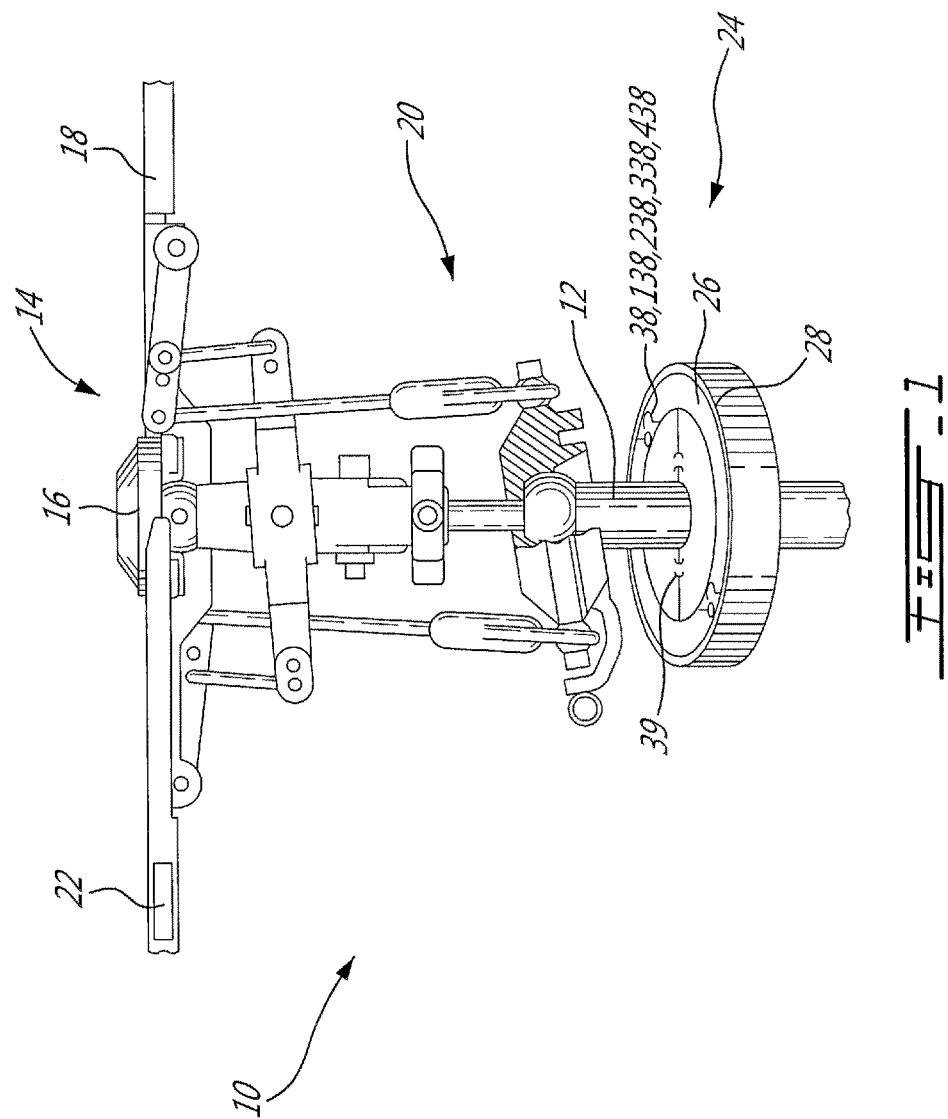

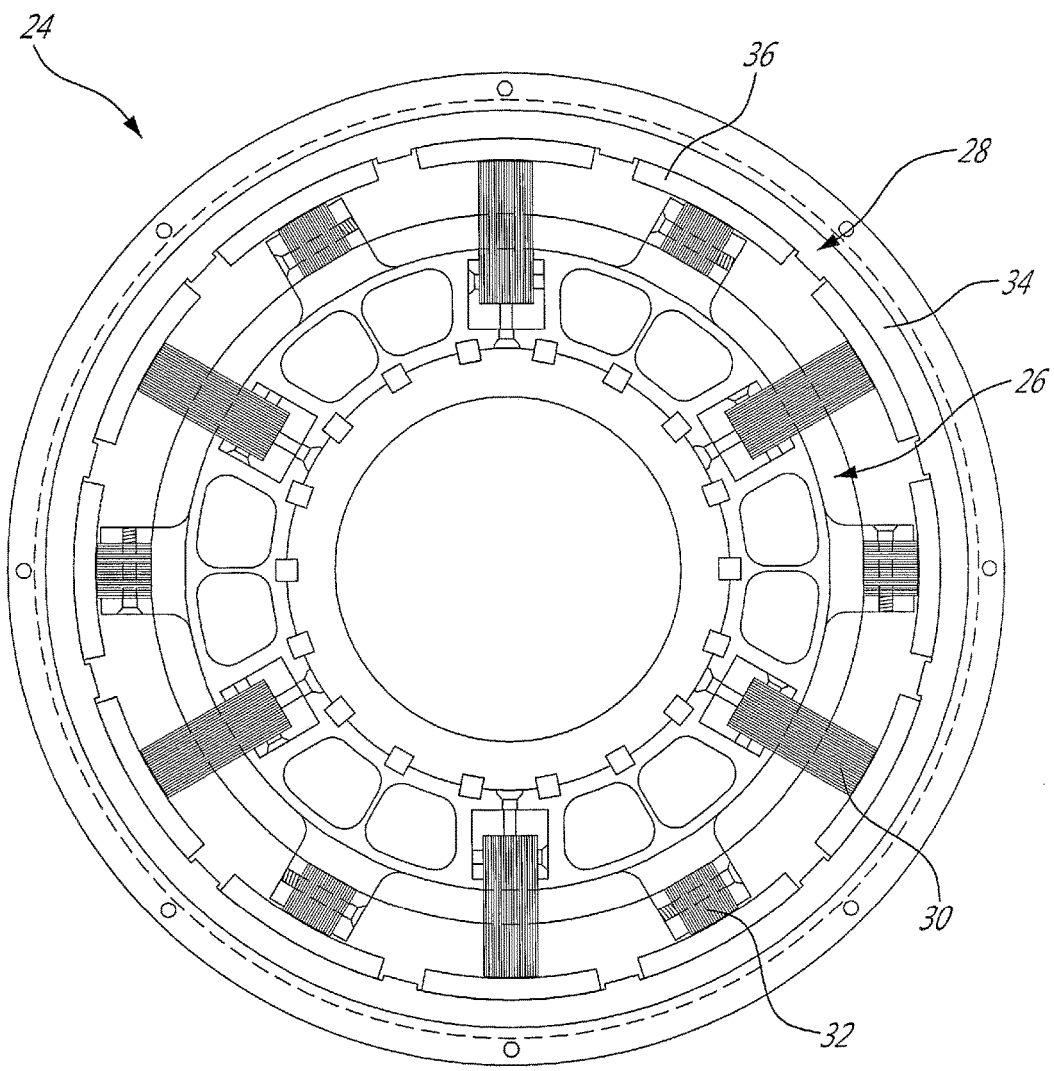

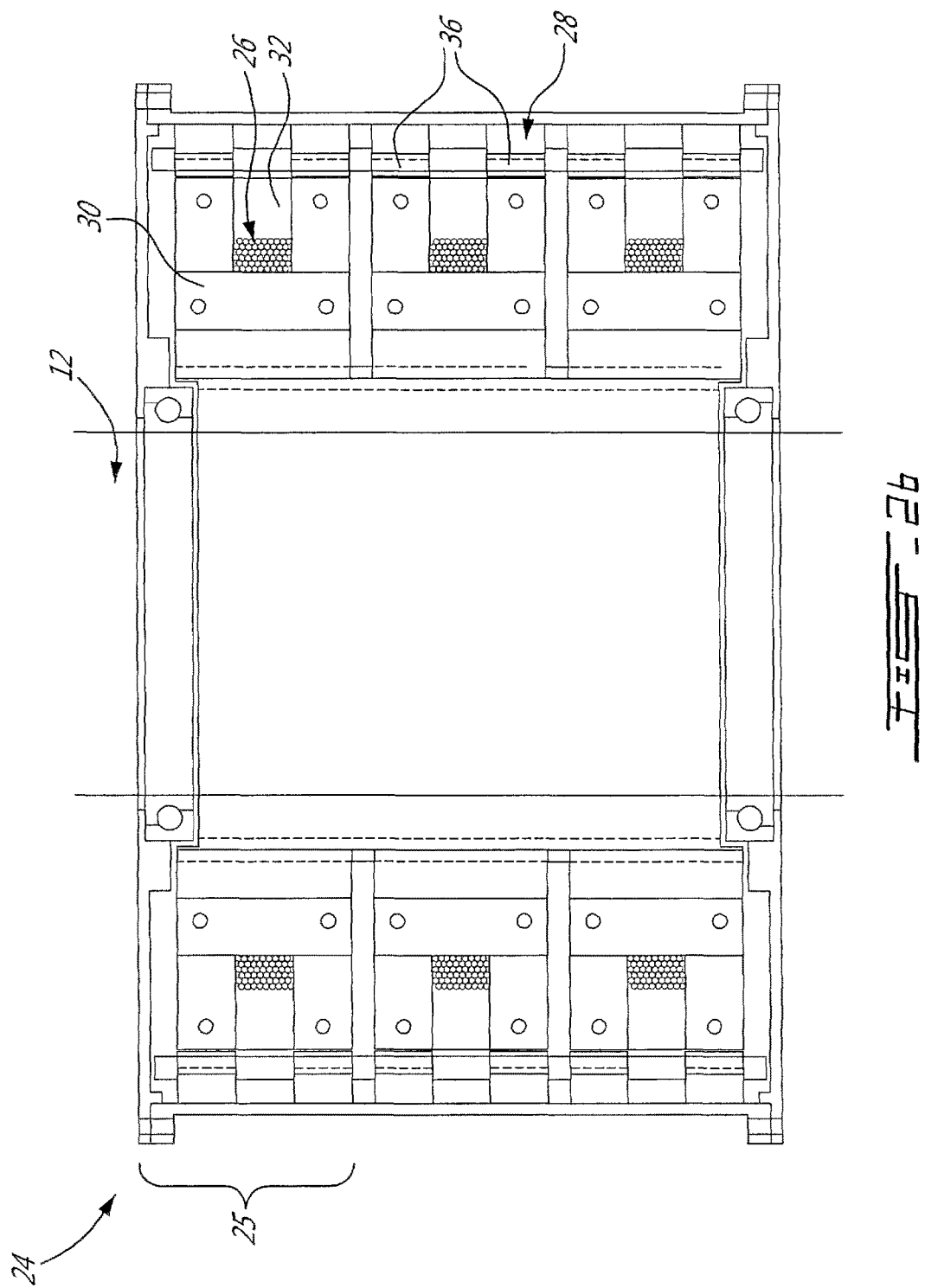

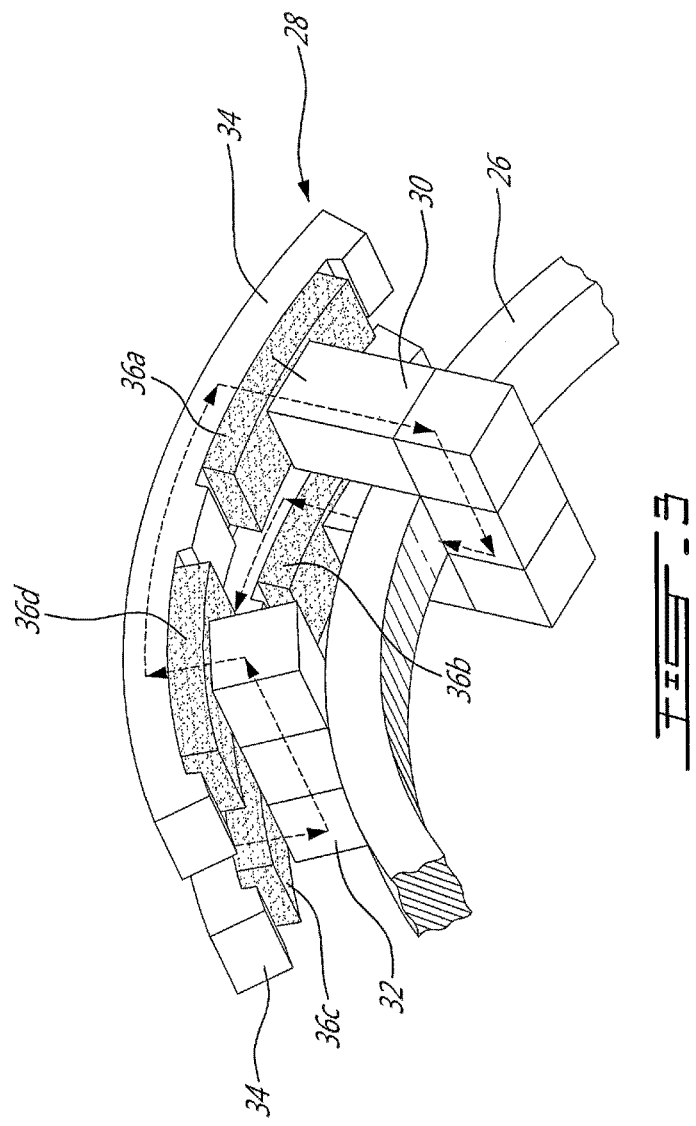

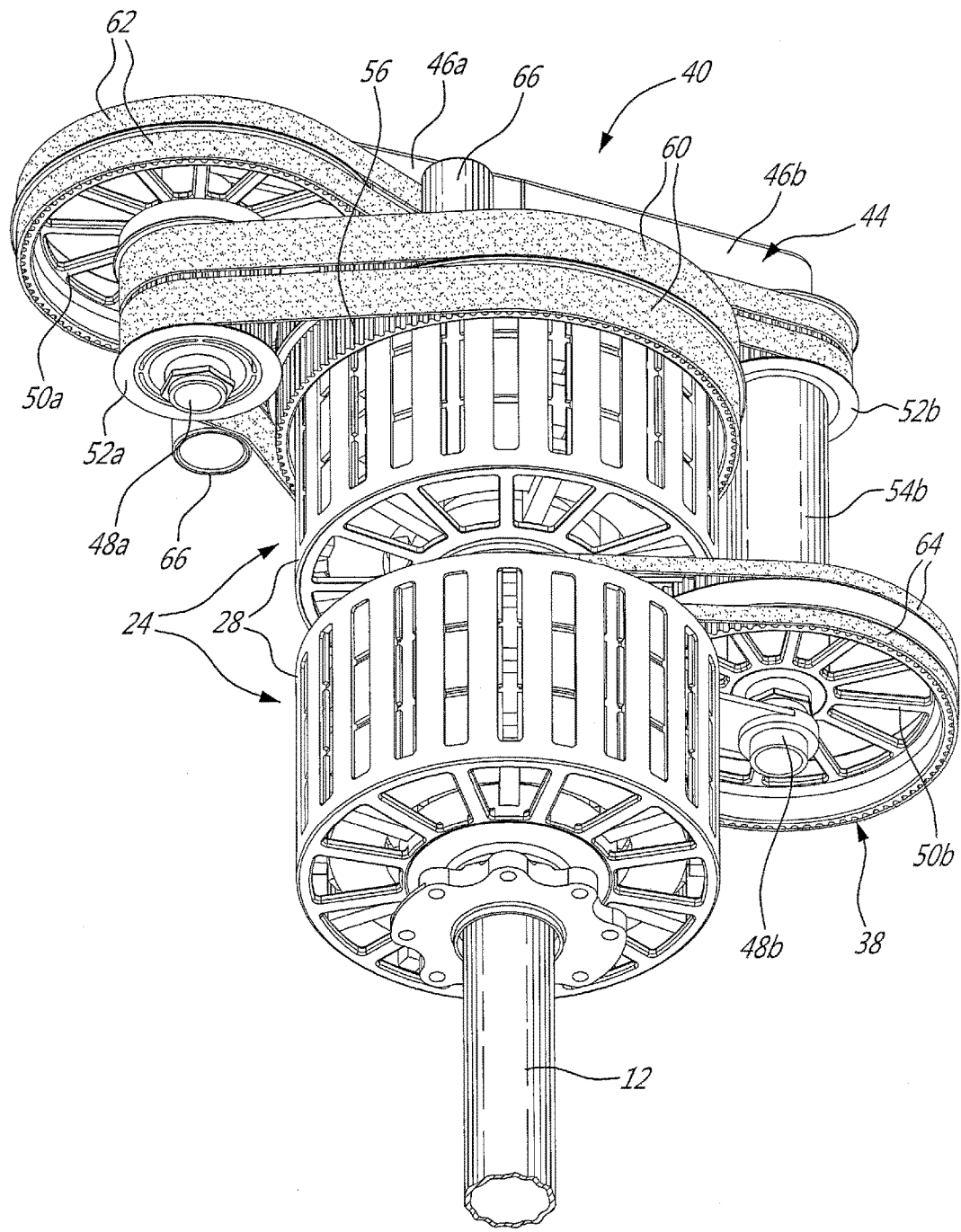

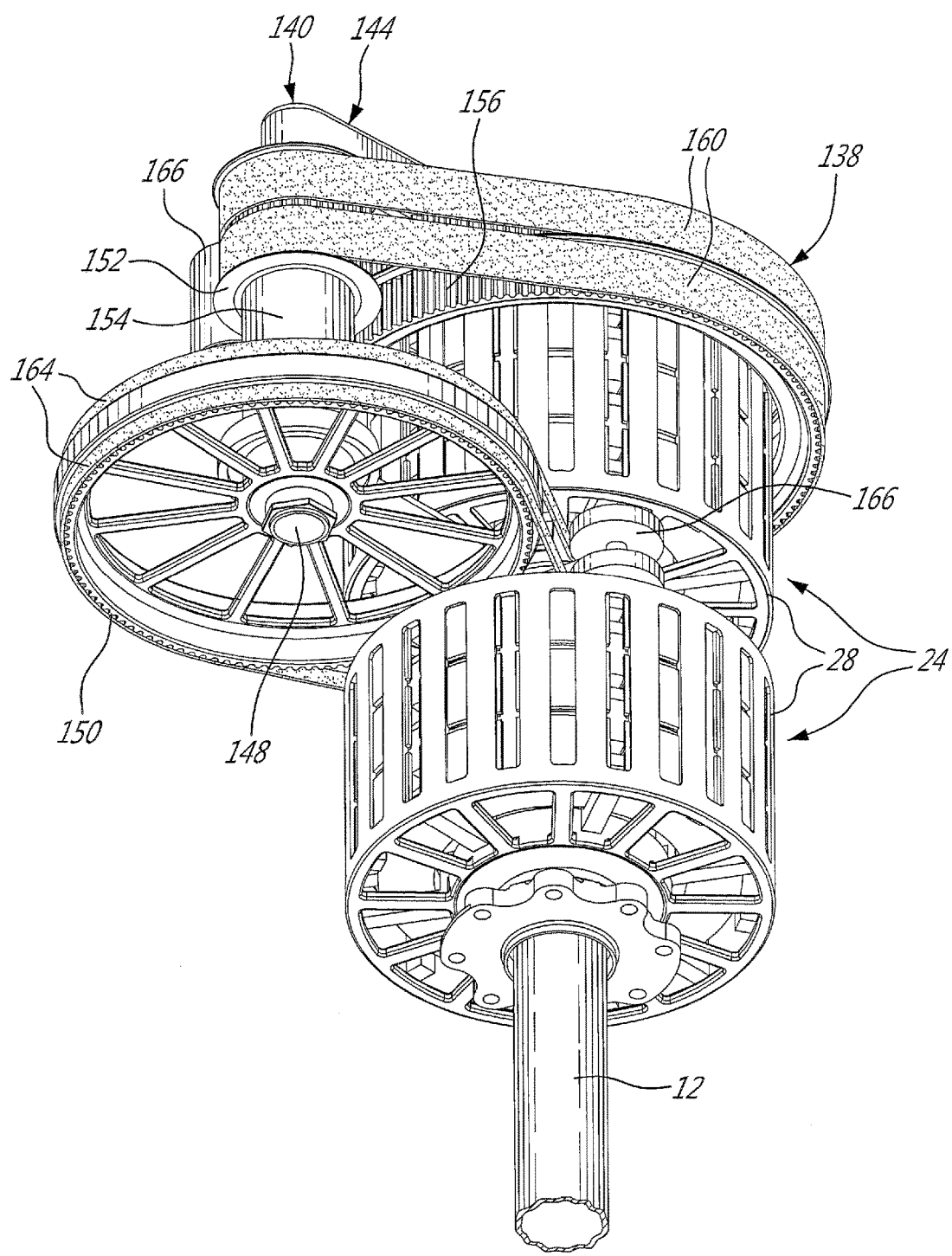

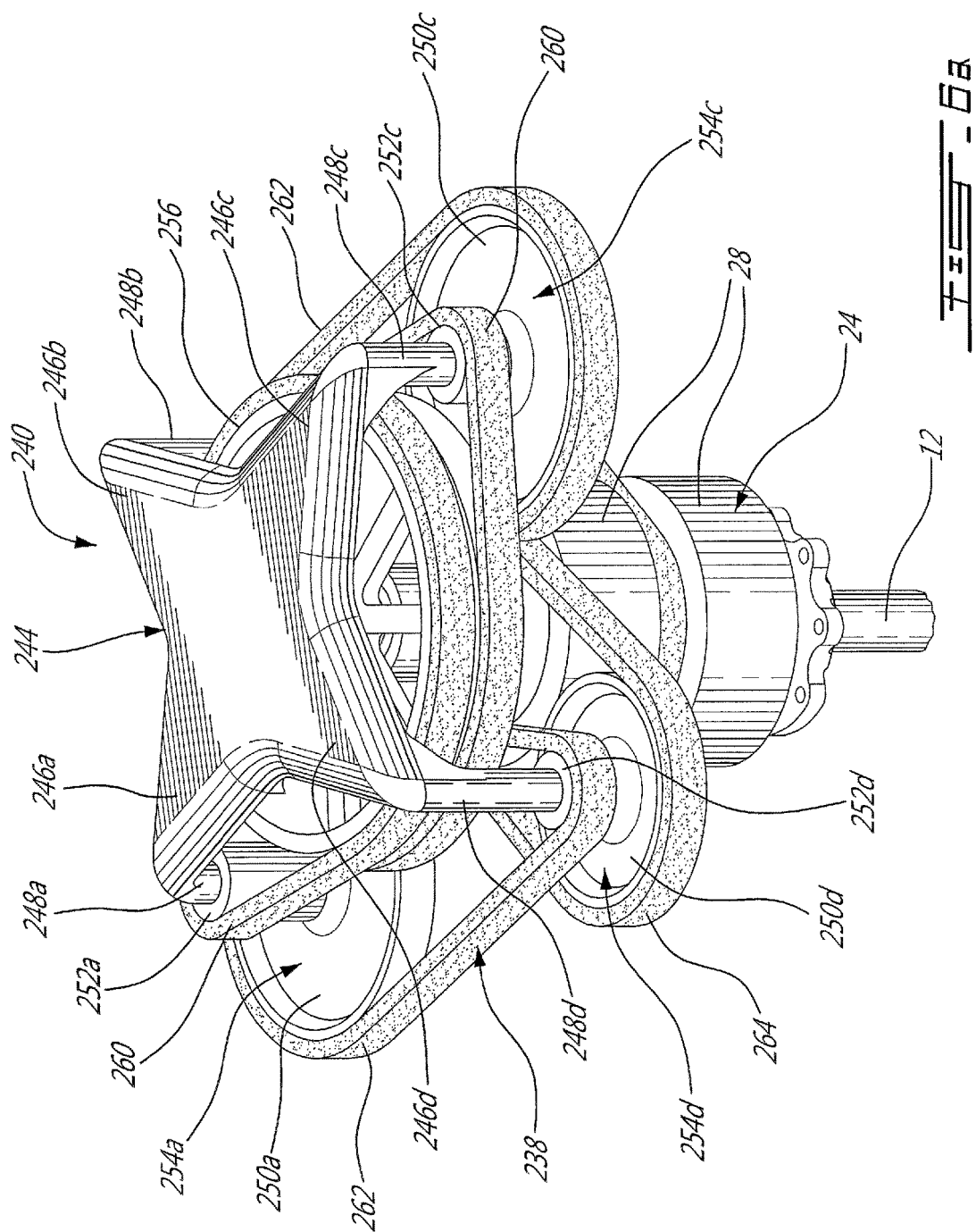

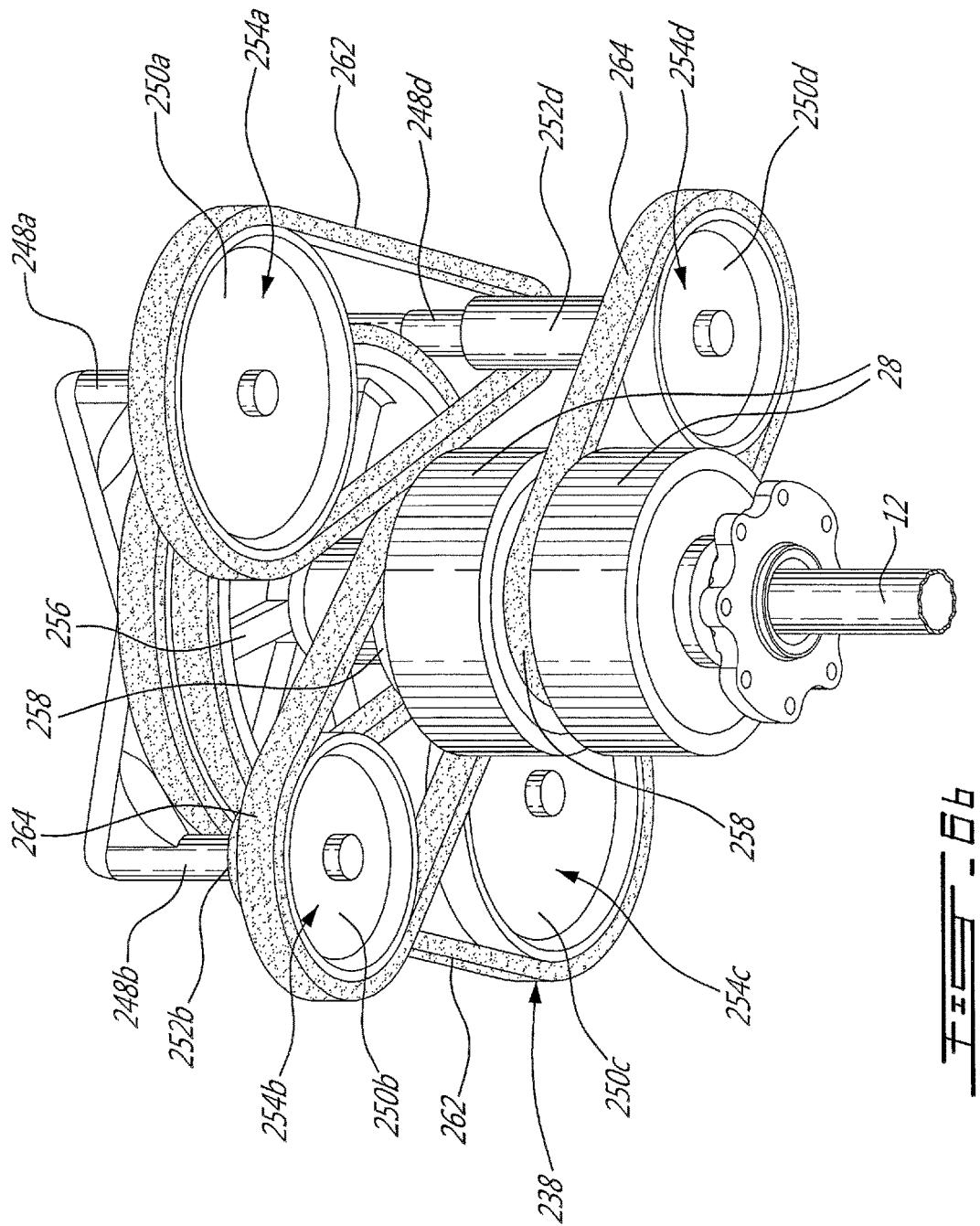

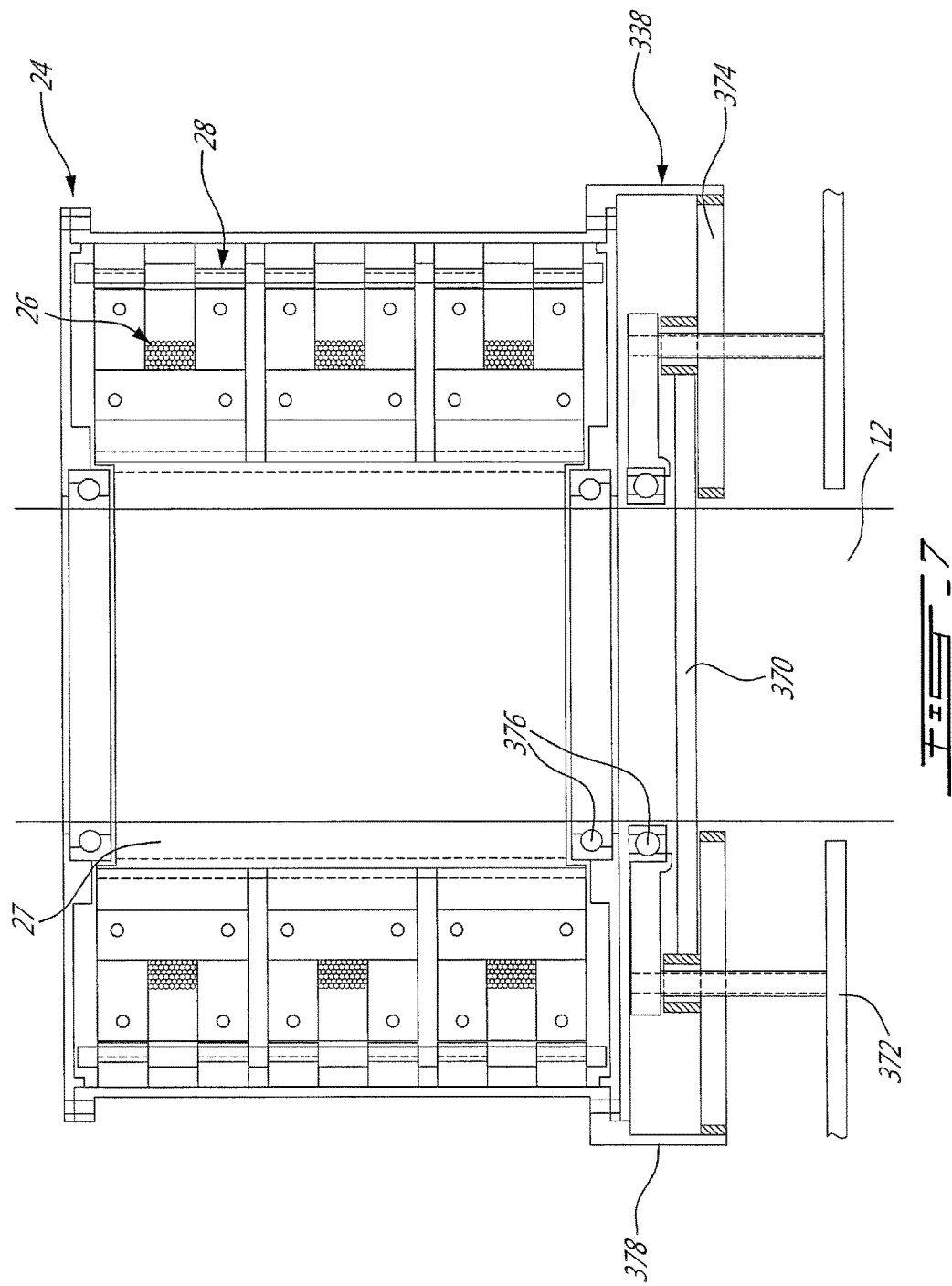

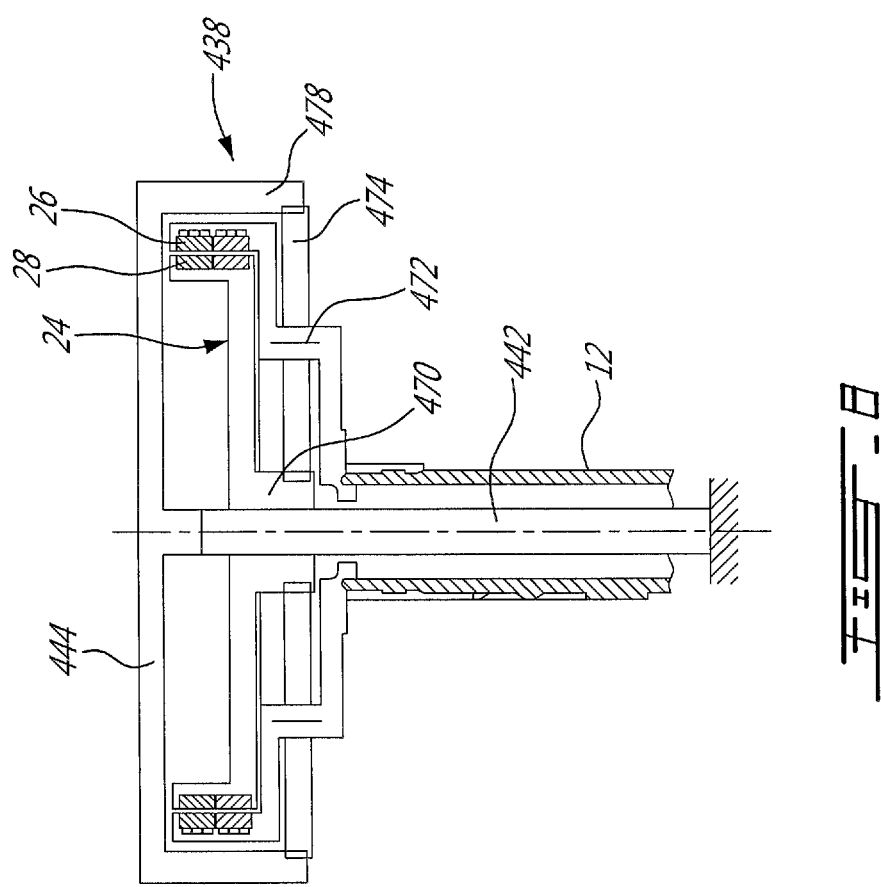

ELECTRICAL GENERATOR FOR ROTATING STRUCTURE

FIELD OF THE INVENTION

The present invention relates to electrical generators, more particularly to an electrical generator for generating power on a rotating structure such as a helicopter mast.

BACKGROUND ART

In some helicopters, rotor blades utilize electric heating elements for ice protection. Typically, these heating elements are powered by a generator having stationary winding assemblies, and the power is transferred to the rotating mast through a slip ring. However, slip rings may increase complexity and operating costs and decrease reliability.

Mast-mounted generators are sometimes used, for example to power lights located on the rotor blades. However, because of the relatively slow rotation of the main rotor mast, mast-mounted generators are usually limited in the amount of power that can be produced.

SUMMARY

In accordance with the present invention, there is provided an electrical generator assembly comprising: a central rotatable shaft having a winding assembly mounted thereto for rotation therewith; a rotatable permanent magnet assembly adjacent the winding assembly and in use cooperating therewith to induce a current in the winding assembly; and a drive system drivingly interconnecting the central shaft and the permanent magnet assembly, the drive system defining a relative rotational speed between the permanent magnet assembly and the winding assembly which is greater than an absolute rotational speed of the winding assembly.

In a particular embodiment, there is provided a helicopter including the generator assembly, a plurality of rotor blades supported by the mast for rotation therewith, and a blade de-icing system on each blade electrically connected to the winding assembly.

Also in accordance with the present invention, there is provided a method of powering an electrical system on a rotating rotor blade supported by a rotating mast, the method comprising: rotating a winding assembly of a generator together with the mast; rotating a permanent magnet assembly of the generator with the mast through a drive system to obtain a rotational speed relative to the mast which is higher than a rotational speed of the mast; inducing a current in the winding assembly with the rotating permanent magnet assembly; and powering the electrical system with the current.

BRIEF DESCRIPTION OF THE DRAWINGS

Reference will now be made to the accompanying drawings, showing by way of illustration one of more particular embodiments) of the present invention and in which:

FIG. 1 is a schematic tridimensional view of a helicopter rotor with a generator assembly;

FIG. 2a is a schematic top view of active elements of active elements of a generator which may be used with the rotor of FIG. 1, in accordance with a particular embodiment;

FIG. 2b is a schematic cross-sectional view of the active elements of the generator of FIG. 2a;

FIG. 3 is a schematic tridimensional view of the magnetic path of a pair of poles of the generator of FIG. 2;

FIGS. 4a-4b are schematic tridimensional views of a generator assembly in accordance with a particular embodiment;

FIGS. 5a-5b are schematic tridimensional views of a generator assembly in accordance with another particular embodiment;

FIGS. 6a-6b are schematic tridimensional views of a generator assembly in accordance with another particular embodiment;

FIG. 7 is a schematic cross-sectional view of a generator assembly in accordance with another particular embodiment; and FIG. 8 is a schematic cross-sectional view of a generator assembly in accordance with further particular embodiment.

DETAILED DESCRIPTION OF PARTICULAR EMBODIMENTS

Figure 4A:
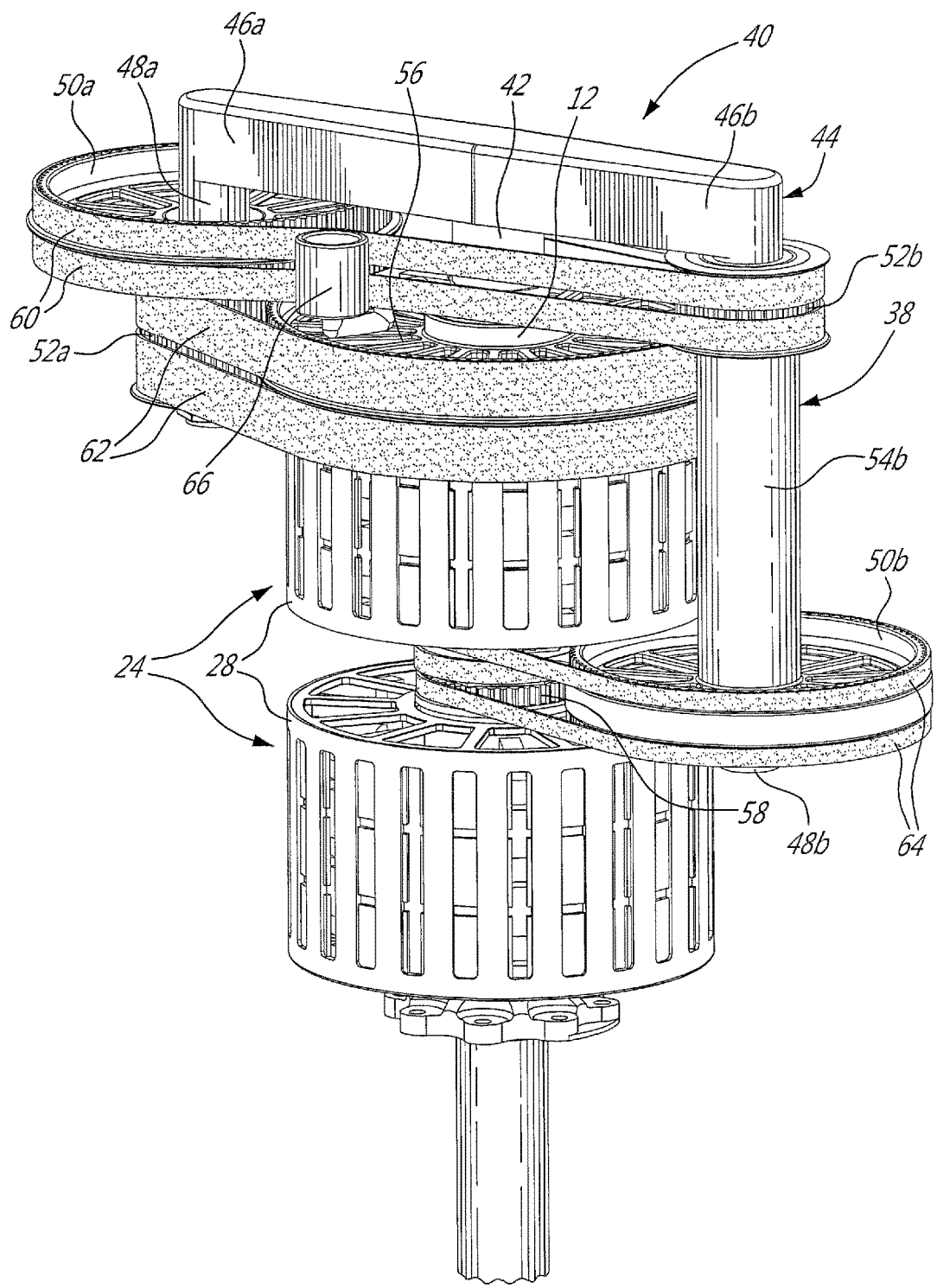

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Referring to FIG. 1, a helicopter main rotor assembly 10 is generally shown. The assembly 10 includes a mast 12 rotationally driven by one or more engines (not shown). A main rotor 14 includes a hub 16 mounted on the mast 12 and a plurality of blades 18 attached to the hub 16 and rotating to provide lift and thrust. A swash plate 20 controls the pitch of the blades 18 and is connected to the helicopter flight controls. The mast 12 is preferably hollow to facilitate installation of wiring and of elements of the drive system (further described below) as well as for weight reduction; however, alternately the mast 12 may be solid.

The blades 18 include an electrically powered device 22 mounted thereon or integrated therein, which in a particular embodiment is a heating element provided on each blade for de-icing. The electrically powered device 22 is connected to at least one electrical generator 24 to be powered thereby. The generator(s) 24 each include a winding assembly 26 and a permanent magnet assembly 28, relatively positioned such as to cooperate to produce a current in the winding assembly 26 upon relative rotation. In the embodiment shown, the winding assembly 26 is surrounded by the magnet assembly 28, but alternately the magnet assembly 28 may be surrounded by the winding assembly 26.

Referring to FIGS. 2a, 2b and 3, in a particular embodiment, the generator 24 is a transverse flux multi-stackable generator. The generator is shown here as including three phases 25 (see FIG. 2b), however more of fewer phases may be provided. The winding assembly 26 includes circumferentially distributed U-shaped poles 30 alternating with I-shaped poles 32, the poles 30, 32 being equally circumferentially spaced apart. In a particular embodiment, the poles 30, 32 are made of laminated electrical steel. The permanent magnet assembly 28 includes a ring 34, which in a particular embodiment is also made of laminated electrical steel, supporting two rows of equally circumferentially spaced apart permanent magnets 36 with alternating poles (N-S). Referring particularly to FIG. 3, in use, the flux created by a first permanent magnet 36a goes through the air gap and circulates radially, axially and radially again along the U-shaped pole 30. The flux then goes back through the air gap to join the flux created by a second permanent magnet 36b, and circulates circumferentially through the ring 34 to join with the flux created by a third magnet 36c. The flux then goes trough the air gap again and circulates axially along an I-shaped pole 32, goes back through the air gap to join the flux created by a fourth magnet 36d, and circulates circumferentially through the ring 34 again. Other types of generators can alternately be used.

Referring back to FIG. 1, the winding assembly 26 is mounted on the mast 12 for direct rotation therewith. The magnet assembly 28 is connected to the mast 12 through a drive system 38, 138, 238, 338, 438 which is part of the generator assembly, such that the mast rotation also drives the magnet assembly rotation. The drive system 38, 138, 238, 338, 438 is configured to produce a relative rotational speed between the magnet assembly 28 and the winding assembly 26, $V_{p/s}$, which is greater in magnitude than the absolute rotational speed $V_s$ of the winding assembly 26, i.e. to have a ratio $$R = \frac{V_{p/s}}{V_s} \text{ greater than 1.}$$

In other words, the relative rotational speed between the winding assembly 26 and the magnet assembly 28 is greater than the relative rotational speed which would be obtained if the magnet assembly 28 had a fixed position. This can be accomplished by either rotating the magnet assembly 28 in a direction opposite that of the rotation of the winding assembly 26, or by rotating the magnet assembly 28 in the same direction as the winding assembly 26 but more than twice as fast. In a particular embodiment, the ratio R is at least 8, e.g. the absolute speed of the magnet assembly 28 is at least 9 times that of the absolute speed of the winding assembly 26 with the two assemblies 26, 28 rotating in a same direction; in another embodiment, the ratio R is at least 14; in another embodiment, the ratio R is at least 24, e.g. the absolute speed of the magnet assembly 28 is at least 25 times that of the absolute speed of the winding assembly 26 with the two assemblies 26, 28 rotating in a same direction. For example, in a particular embodiment the rotational speed of the mast 12 and of the winding assembly 26 is approximately 300-350 rpm, while the rotational speed of the magnet assembly 28 is approximately 3000-5000 rpm. The increased relative rotational speed between the magnet assembly 28 and the winding assembly 26 allows for an increase in the power produced by a generator 24 of a given size and weight. For example, in a particular embodiment, each generator 24 provides a power of approximately 10 KW with the winding assembly 26 rotating at approximately 320 rpm and the magnet assembly 28 rotating in the same direction at approximately 4000 rpm, while a similar generator with the same winding assembly 26 rotational speed, a static magnet assembly 28 and providing the same power may have approximately twice its weight and size.

A clutch 39 (see FIG. 1) may optionally be provided to allow stopping of the rotation of the magnet assembly 28 when the electrically powered device is not required to be active, for example in hot weather in the case of a de-icing system. Alternately, when the electrically powered device is not required to be active, the power can be cut off from the winding assembly 26, allowing it to freely rotate without resistance and effectively turning the generator 24 off.

Referring to FIGS. 4a-4b, a generator assembly in accordance with a particular embodiment is shown. In this embodiment, two identical generators 24 are provided for redundancy; alternately, a single generator may be provided. Each generator 24 may be a transverse flux generator such as shown in FIGS. 2a, 2b and 3 and as described above or any other adequate type of generator.

The drive system 38 shown is a belt drive, with a series of belts and pulleys interconnecting the magnet assembly 28 and the mast 12. The pulleys are supported by a support structure 40, including a static central post 42 (see FIG. 4a) extending through the hollow center of the helicopter mast 12. The structure 40 also includes a linear top member 44 defining two aligned arms 46a,b extending radially in opposed directions on top of the central post 42 and perpendicularly thereto, such as to define a T-shape therewith. Each arm 46a,b of the top member 44 has a fixed support shaft 48a,b extending downwardly therefrom and attached thereto. The first support shaft 48a receives a large double pulley 50a on top of a small double pulley 52a. The pulleys 50a, 52a are vertically spaced apart and are interconnected to rotate together around the first support shaft 48a. The second support shaft 48b receives a small double pulley 52b on top of a large double pulley 50b, the pulleys 50b, 52b being vertically spaced apart and interconnected through a hollow shaft 54b to rotate together around the second support shaft 48b. A mast double pulley 56 is provided on the mast on top of the generators and rotates together with the mast 12. A respective magnet assembly pulley 58 (see FIG. 4a) is provided around the mast 12 in connection with each magnet assembly 28 and rotates together with the respective magnet assembly 28, with the two magnet assembly pulleys 58 being adjacent to one another and of a same size such that the two magnet assemblies 28 rotate at a same speed. Each double pulley includes two adjacent circumferential grooves each sized to receive a belt therein.

A first pair of belts 60 drivingly interconnects the larger mast pulley 56 to the smaller bottom pulley 52a of the first support shaft 48a, thus driving the first pulleys 50a, 52a at a greater rotational speed than that of the mast 12. A second pair of belts 62 drivingly interconnects the larger top pulley 50a of the first shaft 48a to the smaller top pulley 52b of the second shaft 48b, thus driving the second pulleys 50b, 52b at a greater rotational speed than that of the first pulleys 50a, 52a. A third pair of belts 64 drivingly interconnects the larger bottom pulley 50b of the second support shaft 48b to each of the smaller magnet assembly pulleys 58, thus driving the magnet assemblies 28 at a greater rotational speed than that of the second pulleys 50b, 52b. Tensioners 66 (only some of which are shown) are provided on each belt or pair of belts 60, 62, 64 to maintain proper tension after assembly.

In a particular embodiment, each belt 60, 62, 64 provides for a reduction ratio of at most 3.5:1 to conform to particular belt requirements; the desired overall reduction ratio is obtained through selection of the relative sizes of the pulleys rotating together and selection of the number of stages or belts used. In a particular embodiment, the belts 60, 62, 64 are synchronous belts and the pulleys 50a,b, 52a,b, 56, 58 are correspondingly toothed, to limit slipping with increased power. Other types of belts can alternately be used, for example V-belts.

Figure 5A:
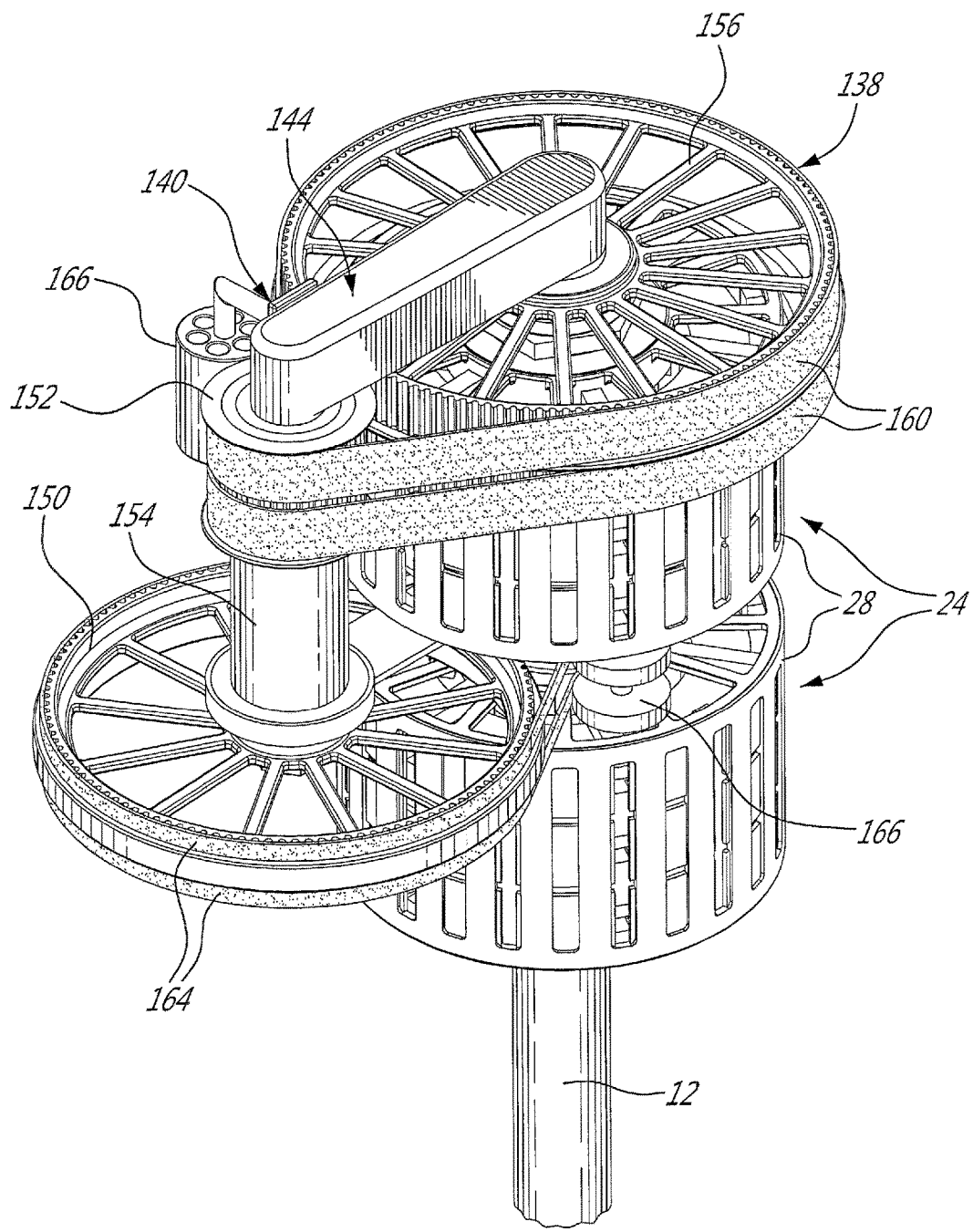

Referring to FIGS. 5a-5b, a generator assembly in accordance with another particular embodiment is shown, also including two identical generators 24 and a belt drive system 138. Each generator 24 may be as shown in FIGS. 2a, 2b and 3 or may be any other adequate type of generator, and/or a single generator may be provided instead of two.

The drive system 138 is similar to the system 38 of FIGS. 4a-4b, but includes two stages of transmission instead of three. A support structure 140 includes a static central post (not shown) extending through the center of the helicopter mast 12 and a linear top member 144 extending radially from the top of the central post. A fixed support shaft 148 (see FIG. 5b) extends downwardly from the radially outward end of the top member 144. The support shaft 148 receives a small double pulley 152 on top of a large double pulley 150, the pulleys 150, 152 being vertically spaced apart and interconnected through a hollow shaft 154 to rotate together. A mast double pulley 156 is provided on the mast 12 on top of the generators and rotates together with the mast 12. A respective magnet assembly pulley (not shown) is provided around the mast 12 in connection with each magnet assembly 28 and rotates together with the respective magnet assembly 28. Each double pulley includes two adjacent circumferential grooves each sized to receive a belt therein. A first pair of belts 160 drivingly interconnects the larger mast pulley 156 to the smaller bottom pulley 152 of the support shaft 148, and a second pair of belts 164 drivingly interconnects the larger bottom pulley 150 of the support shaft 148 to each of the smaller magnet assembly pulleys 158. Tensioners 166 are provided on the belts 160, 164.

Referring to FIGS. 6a-6b, a generator assembly in accordance with another particular embodiment is show. The drive system 238 is also a belt drive, for example a synchronous belt drive. However, here the drive for each generator 24 is provided by separate pulleys.

The pulleys are supported by a support structure 240, including a static central post (not visible) extending through the hollow center of the helicopter mast 12, and a top member 244 having four equally circumferentially spaced apart arms 246a,b,c,d extending radially from the top of the central post and perpendicularly thereto. Each arm 246a,b,c,d of the top member 244 has a fixed support shaft 248a,b,c,d extending downwardly therefrom and attached thereto. Each support shaft 248a,b,c,d extends through a respective pulley member 254a,b,c,d which is retained thereon such as to be freely rotatable. Each pulley member 254a,b,c,d defines a top small pulley 252a,b,c,d and a bottom large pulley 250a,b,c,d which are interconnected such as to rotate together, for example by being integrally formed. Two mast pulleys 256 are provided on the mast 12 on top of the generators 24 and rotate together with the mast 12. A respective magnet assembly pulley 258 (see FIG. 6b) is provided around the mast 12 in connection with and on top of each magnet assembly 28, and rotates together with the respective magnet assembly 28.

A respective first belt 260 (see FIG. 6a) drivingly interconnects each larger mast pulley 256 to the smaller top pulley 252a,c of a respective one of the first and third opposed support shafts 248a,c, thus driving the pulley members 254a,c of these shafts at a greater rotational speed than that of the mast 12. A second belt 262 drivingly interconnects each larger bottom pulley 250a,c of the first and third opposed support shafts 248a,c to the smaller top pulley 252b,d of a respective one of the second and fourth opposed shafts 248b,d, thus driving the second and fourth pulley members 254b,d at a greater rotational speed than the first and third pulley members 254a,c. A third belt 264 drivingly interconnect the larger bottom pulley 250b,d of the second and fourth support shaft 148b,d to a respective one of the smaller magnet assembly pulleys 258, thus driving the magnet assemblies 28 at a greater rotational speed than that of the second and fourth pulley members 254b,d. In the embodiment shown, the pulleys are sized such that the two magnet assemblies 28 rotate at a same speed.

In a particular embodiment, flexible connections are provided between the top member arms 246a,b,c,d and each support shaft 248a,b,c,d such as to be able to move the support shafts 248a,b,c,d inwardly to reduce tension for assembly of the pulleys and then back to a tensioning position once the pulleys are assembled.

Referring to FIG. 7, a generator assembly in accordance with another particular embodiment is shown. In this embodiment a single three phase generator 24 similar to the one shown in FIGS. 2a-2b-3 is shown, although alternately two or more generators could be provided, and other generator configurations could be used.

The drive system 338 shown is a gear drive of the planetary type. The mast 12 is mounted to the core 27 of the winding assembly 26 and to a sun gear 370 which is located under the winding assembly 26. A carrier 372 is supported on a fixed element of the helicopter (not shown) and supports a plurality of planet gears 374 meshed with the sun gear 370. The magnet assembly 28 is received around the winding assembly 26 and supported around the mast 12 by bearings 376 such as to be rotatable with respect thereto. The magnet assembly 28 includes a ring gear 378 protruding downwardly therefrom and meshed with the planet gears 374. Bearings 376 are provided between the carrier 372 and the magnet assembly 28 for rotational support. Rotation of the mast 12 together with the winding assembly 26 drives the rotation of the magnet assembly 28 through the meshed sun, planet and ring gears 370, 374, 378. In a particular embodiment, the magnet assembly 28 rotates 4.5 times faster than the mast 12.

Referring to FIG. 8, a generator assembly in accordance with a further particular embodiment is shown. In this embodiment a single generator 24 is shown, although alternately two or more generators could be provided.

The drive system 438 shown is also a gear drive of the planetary type. A static central post 442 extends through the hollow center of the helicopter mast 12, and a top member 444 extends radially in top opposed directions from the top of the post perpendicularly thereto. The top member 444 supports a static ring gear 478 extending downwardly therefrom. An annular winding assembly 26 is connected to the mast 12 through a carrier portion 472. A plurality of planet gears 474 are supported by the carrier portion 472 under the winding assembly 26 and meshed with the ring gear 478. The annular winding assembly 26 surrounds the permanent magnet assembly 28, which includes on a bottom thereof a sun gear 470 meshed with the planet gears 474. Rotation of the mast 12 together with the winding assembly 26 drives the rotation of the magnet assembly 28 through the meshed sun, planet and ring gears 470, 474, 478.

Alternate types of drive system may also be used, included but not limited to different types of belt drives with fewer or more stages, planetary drives having a plurality of stages and/or different configurations, harmonic drives, etc. Any drive system which may allow for the magnet assembly 28, 28 to be driven by the mast 12 with a relative rotational speed between the assemblies 26, 28 greater than the absolute rotational speed of the winding assembly 26 and mast 12, to increase the power provided by the generator 24, may alternately be used.

Although the generator and drive system have been shown as applied to a helicopter mast to power an electrical device on the blades, other uses are also considered, included but not limited to wind mills and other rotating mechanical systems rotating at a relatively low speed.

Accordingly, the embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:

1. An electrical generator assembly comprising:
   a central rotatable shaft having first and second winding assemblies mounted thereto for rotation therewith, the central shaft being a hollow helicopter mast;
   a first rotatable permanent magnet assembly adjacent the first winding assembly and in use cooperating therewith to induce a current in the first winding assembly;
   a second rotatable permanent magnet assembly adjacent the second winding assembly and in use cooperating therewith to induce a current in the second winding assembly; and
   a drive system drivingly interconnecting the central shaft and the first permanent magnet assembly and interconnecting the central shaft and the second permanent magnet assembly, the drive system defining a relative rotational speed between the first permanent magnet assembly and the first winding assembly which is greater than an absolute rotational speed of the first winding assembly, the drive system defining a relative rotational speed between the second permanent magnet assembly and the second winding assembly which is greater than an absolute rotational speed of the second winding assembly;
   wherein the drive system is a belt drive including:
      a plurality of belts,
      first and second mast pulleys connected to the central shaft to rotate therewith,
      a first magnet assembly pulley connected to the first permanent magnet assembly to rotate therewith,
      a second magnet assembly pulley connected with the second permanent magnet assembly and additional pulleys drivingly engaged to one another, and
      first, second, third and fourth support shafts each receiving a large pulley interconnected with a small pulley smaller than the large pulley;
   wherein the belts drivingly interconnect:
      each mast pulley to the small pulley of a respective one of the first and third opposed support shafts, the mast pulley being larger than the small pulley,
      each large pulley of the first and third opposed support shafts to the small pulley of a respective one of the second and fourth opposed shafts, and
      each large pulley of the second and fourth support shaft to a respective one of the magnet assembly pulleys, the magnet assembly pulleys being smaller than the large pulleys.

2. The generator assembly according to claim 1, wherein the permanent magnet assembly is annular and surrounds the winding assembly.

3. The generator assembly according to claim 1, wherein the drive system drives the rotatable permanent magnet assembly in a direction opposite of that of the rotation of the central shaft.

4. The generator assembly according to claim 1, wherein the drive system drives the rotatable permanent magnet assembly in a same direction as that of the rotation of the central shaft.

5. The generator assembly according to claim 1, wherein the relative rotational speed between the permanent magnet assembly and the winding assembly is at least 9 times greater than the absolute rotational speed of the winding assembly.

6. The generator assembly according to claim 1, wherein the winding assembly and permanent magnet assembly define a transverse flux generator.

7. The generator assembly according to claim 1, wherein the winding assembly and the rotatable permanent magnet assembly form a generator having at least three phases.

8. An electrical generator assembly comprising:
   a central rotatable shaft having a winding assembly mounted thereto for rotation therewith, the central shaft being a hollow helicopter mast;
   a rotatable permanent magnet assembly adjacent the winding assembly and in use cooperating therewith to induce a current in the winding assembly; and
   a drive system drivingly interconnecting the central shaft and the permanent magnet assembly, the drive system defining a relative rotational speed between the permanent magnet assembly and the winding assembly which is greater than an absolute rotational speed of the winding assembly;
   wherein the drive system is a belt drive including:
      a plurality of belts,
      a mast pulley connected to the central shaft to rotate therewith,
      a magnet assembly pulley connected to the permanent magnet assembly to rotate therewith,
      a first large pulley interconnected with a first small pulley smaller than the first large pulley to rotate together around a first support shaft; and
      a second support shaft receiving a second small pulley and a second large pulley interconnected to rotate together around the second support shaft, the second large pulley larger than the second small pulley;
   wherein the belts drivingly interconnect:
      the mast pulley to the first small pulley to drive the pulleys of the first support shaft at a rotational speed greater than that of the mast, the first small pulley smaller than the mast pulley,
      the first large pulley to the second small pulley to drive the pulleys of the second support shaft at a rotational speed greater than that of the pulleys of the first support shaft, and
      the second large pulley to the magnet assembly pulley to drive the magnet assembly at a rotational speed greater than that of the pulleys of the second support shaft, the magnet assembly pulley smaller than the second large pulley.

9. The generator assembly according to claim 8, wherein the permanent magnet assembly is annular and surrounds the winding assembly.

10. The generator assembly according to claim 8, wherein the drive system drives the rotatable permanent magnet assembly in a direction opposite of that of the rotation of the central shaft.

11. The generator assembly according to claim 8, wherein the drive system drives the rotatable permanent magnet assembly in a same direction as that of the rotation of the central shaft.

12. The generator assembly according to claim 8, wherein the relative rotational speed between the permanent magnet assembly and the winding assembly is at least 9 times greater than the absolute rotational speed of the winding assembly.

13. The generator assembly according to claim 8, wherein the winding assembly and permanent magnet assembly define a transverse flux generator.

14. The generator assembly according to claim 8, wherein the winding assembly and the rotatable permanent magnet assembly form a generator having at least three phases.

15. A helicopter including a generator assembly according to claim 8, a plurality of rotor blades supported by the rotatable shaft for rotation therewith, and a blade de-icing system on each blade electrically connected to the winding assembly.

16. An electrical generator assembly comprising:
- a central rotatable shaft having a winding assembly mounted thereto for rotation therewith, the central shaft being a hollow helicopter mast;
- a rotatable permanent magnet assembly adjacent the winding assembly and in use cooperating therewith to induce a current in the winding assembly; and
- a drive system drivingly interconnecting the central shaft and the permanent magnet assembly, the drive system defining a relative rotational speed between the permanent magnet assembly and the winding assembly which is greater than an absolute rotational speed of the winding assembly;
- wherein the drive system is a belt drive including:
  - a plurality of belts,
  - a mast pulley connected to the central shaft to rotate therewith,
  - a magnet assembly pulley connected to the permanent magnet assembly to rotate therewith, and
  - a large pulley interconnected with a small pulley smaller than the large pulley to rotate together around a support shaft; and
- wherein the belts drivingly interconnect:
  - the mast pulley to the small pulley of the support shaft, the mast pulley larger than the small pulley, and
  - the large pulley of the support shaft to the magnet assembly pulley, the magnet assembly pulley smaller than the large pulley.

17. The generator assembly according to claim 16, wherein the permanent magnet assembly is annular and surrounds the winding assembly.

18. The generator assembly according to claim 16, wherein the drive system drives the rotatable permanent magnet assembly in a direction opposite of that of the rotation of the central shaft.

19. The generator assembly according to claim 16, wherein the drive system drives the rotatable permanent magnet assembly in a same direction as that of the rotation of the central shaft.

20. The generator assembly according to claim 16, wherein the relative rotational speed between the permanent magnet assembly and the winding assembly is at least 9 times greater than the absolute rotational speed of the winding assembly.

21. The generator assembly according to claim 16, wherein the winding assembly and permanent magnet assembly define a transverse flux generator.

22. The generator assembly according to claim 16, wherein the winding assembly and the rotatable permanent magnet assembly form a generator having at least three phases.

23. A helicopter including a generator assembly according to claim 16, a plurality of rotor blades supported by the rotatable shaft for rotation therewith, and a blade de-icing system on each blade electrically connected to the winding assembly.

* * * * *